July 29, 1969 W. KLEIN 3,458,244
OPTICAL SYSTEM OF THE ZOOM TYPE
Filed Dec. 27, 1966 2 Sheets-Sheet 1

INVENTOR
WALTER KLEIN
BY *Otto John Munz*
ATTORNEY.

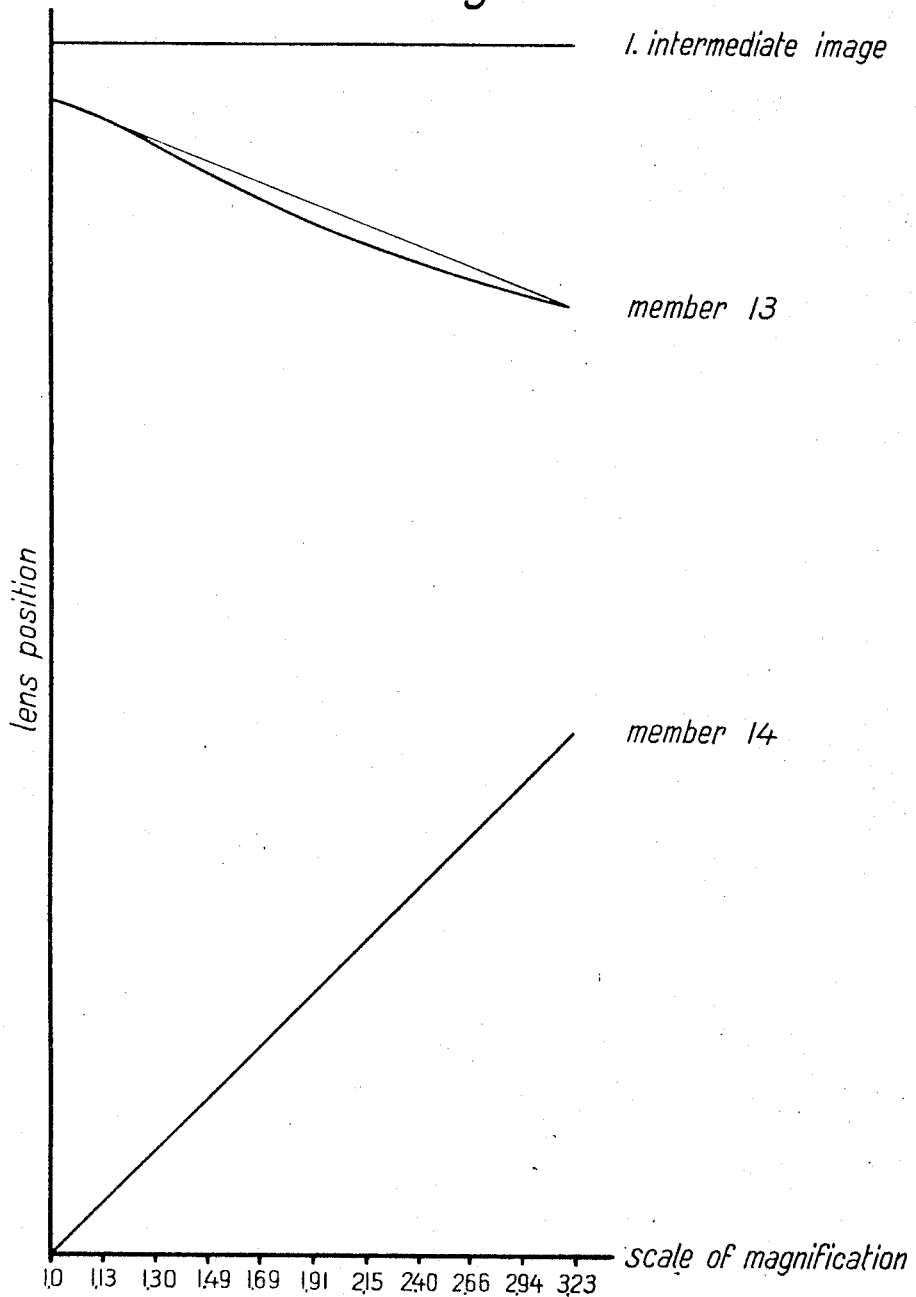

United States Patent Office 3,458,244
Patented July 29, 1969

3,458,244
OPTICAL SYSTEM OF THE ZOOM TYPE
Walter Klein, Wissmar, Germany, assignor to Ernst Leitz G.m.b.H., Wetzlar, Germany
Continuation-in-part of application Ser. No. 410,185, Nov. 10, 1964. This application Dec. 27, 1966, Ser. No. 604,741
Claims priority, application Germany, Nov. 20, 1963, L 46,388; Dec. 31, 1965, L 52,510
Int. Cl. G02b 7/04, 15/14
U.S. Cl. 350—43          3 Claims

ABSTRACT OF THE DISCLOSURE

The present invention relates to an optical zoom system, which is associated with a microscope, the zoom system having two members of positive power of refraction which are relatively adjustable. The zoom optical system is in a housing and lies in a horizontal plane, when included in a microscope.

This application is a continuation-in-part of application Ser. No. 410,185, filed Nov. 10, 1964, for "Optical System," and the filing date thereof and the priority date of its corresponding German application No. L46,388 IXa/42h, filed Nov. 20, 1963, as well as the priority date of German application No. L52,510 IXa/42, filed Dec. 31, 1965, are claimed for all subject matters common therewith.

Background of the invention

In the copending U.S. application Ser. No. 410,185, optical systems of the zoom type are described wherein two members having positive power of refraction are adjustable with respect to each other, the first member being adjustable starting with a position giving a magnification of approximately 1:1 and movable toward positions giving smaller magnifications, and the second member being adjustable away from the image plane. Such zoom systems are distinguished by the fact that, when the two members are linearly adjusted, the displacements of the image plane about a zero plane are particularly small. In order to maintain the image plane constant, it is also possible in these systems to move one of the two members along a non-linear directrix which, since it deviates only slightly from a straight line, can therefore be constructed very simply with the required degree of accuracy. It is particularly advantageous that it is not necessary to reverse the direction of travel of one of the two members. The systems disclosed in detail in the noted U.S. patent application are especially suitable for zoom oculars.

Where microscopes have included zoom systems, the microscope has been particularly constructed to incorporate the zoom system, thus requiring re-design and re-tooling and adding significantly to the costs of such microscopes. Further, the elements of the zoom optical system have been positioned in successive vertical planes, thus resulting in an overly high and cumbersome construction.

Summary of the invention

Among the objects of the present invention are: to provide a microscope with an improved zoom optical system; to provide such a microscope with the zoom optical system in a separate housing; to provide a microscope with a zoom optical system which does not require special microscope construction or add greatly to the height of the microscope. Other objects include the provision of an improved zoom optical system.

In accomplishing the above objects, it has now been discovered that zoom optical systems substantially like the zoom optical system of application Ser. No. 410,185 can be particularly advantageously included as an intermediate system between the objective and the ocular of a microscope. In this connection, it is advantageous to arrange the succession of the two members in the path of rays (beam path) so that the first member is adjustable away from the intermediate image produced by the objective, and the second member is adjustable from the position giving a magnification of approximately 1:1 in the direction toward positions giving higher magnifications. It is advantageous to provide the intermediate system in a housing insertable between the stand of the microscope and the viewing hood (tubus) of the microscope. A particularly advantageous arrangement is obtained when the intermediate system itself is positioned laterally with respect to the optical axis of the microscope, and when a mirror is provided deflecting with its front face the beam of rays coming from the objective in the direction toward the intermediate system, and with its rear face the beam of rays coming from the intermediate system in the direction toward the ocular of the microscope. In order to make it possible to conduct a direct observation, without the interposition of the intermediate system, this mirror can be provided in such a manner that it is interchangeable with a simple auxiliary optical system for compensating for the differences in path lengths.

In a suitable construction, at least one, and preferably two reflecting surfaces are interposed between the two adjustable members of the zoom system. It has proven to be advantageous, for regulating the position of the pupils and the range of magnification, to provide at least one stationary member in front of the zoom system, as seen in the light direction.

With the use of two such stationary members, particularly favorable correction conditions result if the focal lengths of the individual members of the entire intermediate system, and their distances, are within the values disclosed therefor in Table 1. In a system according to the invention, these values are represented by the data listed in Table 2. In Table 3, the constructional data for a zoom system having a magnification range of 1.0 to 3.23 are set forth.

Description of the drawings

In the appended drawings, there is illustrated an exemplary arrangement and construction of an intermediate zoom system according to the invention.

FIGURE 4 is a diagram illustrating the displacement motions of the two displaceable members of the zoom system.

Description of the preferred embodiment

Figure 1:
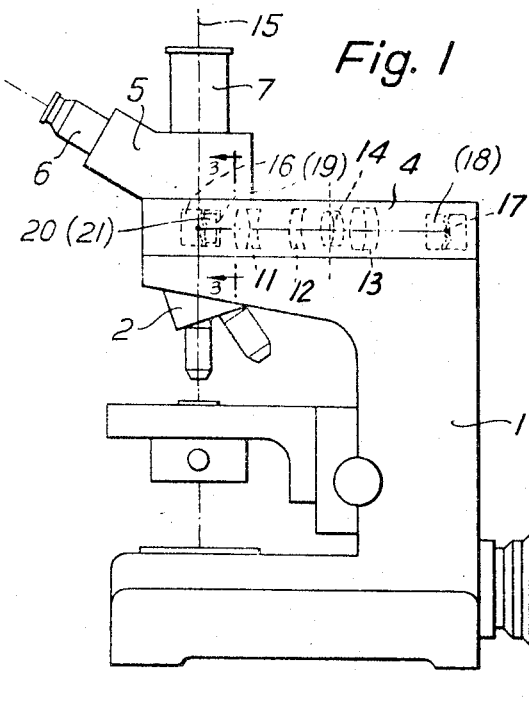
FIGURE 1 is a schematic view of a microscope and an intermediate optical zoom system.

In FIGURE 1, there is shown a stand 1 for a microscope with an objective revolver 2 and a light source 3. A housing 4 is provided on top of the stand 1, housing an intermediate zoom system according to the invention. A microscope tube (tubus) 5 is seated on top of the housing 4, in a conventional manner. This tube 5 can be provided, for example, with an ocular 6 with oblique sight and an attachment 7 for connecting a photographic apparatus thereto, the latter not being shown.

Figure 2:
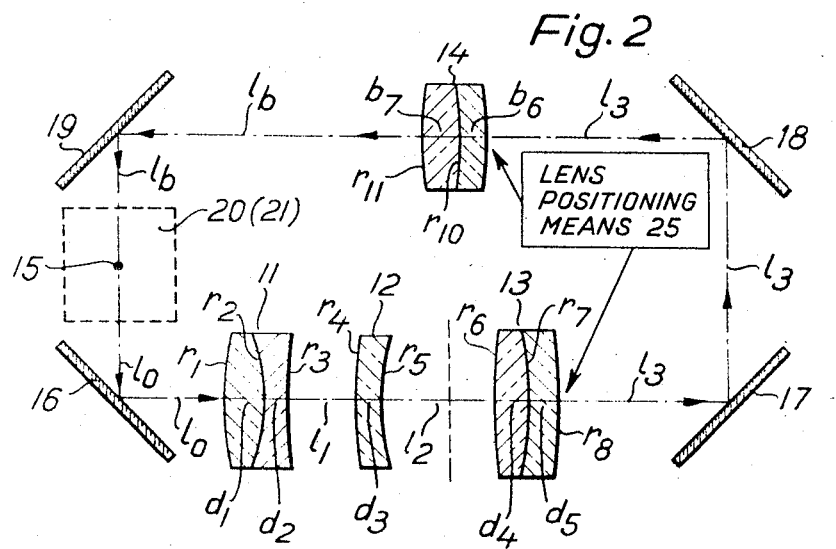
FIGURE 2 is a plan view of the intermediate optical zoom system.

In FIGURE 2, a zoom system according to the invention is illustrated, comprising two stationary members 11 and 12, as well as two members 13 and 14 with positive power of refraction which latter members can be adjusted with respect to each other in accordance with the principles of zoom optics, in the direction of the light path by conventional lenses-positioning means 25. As an example, lens positioning means disclosed in various patents of Class 88-57 may be simply adapted to the present purposes by those skilled in the art. The beam of rays coming from the objective is deflected by a mirror shown in detail in FIGURE 3 from the optical axis 15 in the direction toward a mirror 16. Between the two members 13 and 14, two further mirrors 17 and 18 are provided. A fifth mirror 19 deflects the beam of rays coming from the zoom system to the rear face of the mirror shown in FIGURE 3, this mirror, in turn, deflecting the beam again in the direction of the optical axis 15 toward the tube 5. The optical axis of this zoom system lies in a horizontal plane, and is transverse to the optical axis of the objective.

Figure 3:
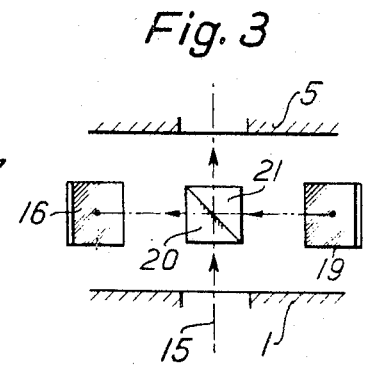
FIGURE 3 is an elevational view of a part of the apparatus and showing particularly a reflecting device thereof.

In FIGURE 3, a cube consisting of two triangular prisms 20 and 21 is illustrated. The hypotenuse surfaces of the two prisms 20 and 21 are fully mirror-lined and glued together. The surface of the mirror formed by the prisms 20 and 21 which is in front, as seen in the light direction, deflects the beams of rays from the optical axis 15 of the microscope in the direction toward mirror 16; the rear face, in turn, deflects the beam of rays coming from the mirror 19 again in the direction of the optical axis 15 of the microscope toward the tube 5.

Table 1, set forth below, provides values for such a system using two fixed and two movable lens members.

TABLE 1

|  |  | $0 < l_0 < 0.5L$ |
|---|---|---|
|  | $|f_1| > 0.3L$ | $0 < l_{1,2} < 0.5L$ |
|  | $|f_2| > 0.3L$ | $0 < l_{2,3} < 0.5L$ |
| $0.1L$ | $< f_3 < 0.5L$ | $0 < l_{3,4} < 0.7L$ |
| $0.15L$ | $< f_4 < 0.35L$ | $0.3L < l_b < 0.9L$ | where $f_1$, $f_2$, etc. are the focal lengths, $l_0$, $l_1$, $l_b$ are the separations and L is the field length, object plane to image plane.

In a preferred optical zoom system in accordance with the invention, the focal lengths and the separations are as set forth in Table 2.

TABLE 2

| | |
|---|---|
| $f_1 = +322.8$ | $L_0 = +58.0$ |
| $f_2 = -221.6$ | $L_{12} = 39.2$ |
| $f_3 = +99.9$ | $L_{23} = 20.4$ to $59.4$ |
| $f_4 = +115.0$ | $L_{34} = 81.1$ to $216.9$ |
| | $L_b = +232.2$ to $+329.1$ |
| $L = 459.1$ | | where $f_1$, $f_2$, etc. are focal lengths and $L_0$, $L_{12}$ etc. are separations.

Further, constructional data for an optical zoom system having a magnification range of 1.0 to 3.23 are set forth in

TABLE 3

| | | $n_d$ | $v_d$ |
|---|---|---|---|
| | $l_0 = +49.265$ | | |
| $r_1 = +57.597$ | $d_1 = 5.0$ | 1.5168 | 64.2 |
| $r_2 = -36.721$ | | | |
| $r_3 = +166.789$ | $d_2 = 3.0$ | 1.6073 | 59.5 |
| | $l_1 = 21.56$ | | |
| $r_4 = +86.311$ | | | |
| $r_5 = +52.549$ | $d_3 = 2.5$ | 1.6200 | 36.3 |
| $r_6 = +150.011$ | $l_2 = 19.222$ to $58.198$ | | |
| $r_7 = -35.937$ | $d_4 = 4.5$ | 1.5725 | 57.5 |
| $r_8 = -68.805$ | $d_5 = 3.0$ | 1.7283 | 28.3 |
| $r_9 = +70.883$ | $l_3 = 79.813$ to $215.633$ | | |
| $r_{10} = +35.993$ | $d_6 = 2.0$ | 1.7283 | 28.3 |
| $r_{11} = -205.21$ | $d_7 = 2.5$ | 1.5714 | 53.0 |
| | $l_b = +229.775$ to $326.618$ | | |

Magnification = 1.0 to 3.23.

wherein $r_1$, $r_2$ etc. are the successive radii of the lens components or their individual elements, $l_0$, $l_1$ etc. are the separations between the lens, between the object and the lens nearest it and between the image and the lens nearest it, $d_1$, $d_2$ etc. are the axial thicknesses of the lenses or their elements $n_d$ is the refractive index of the lens or lens element glasses, and $v_d$ is the Abbe number of these glasses.

On the basis of the data for a zoom system according to the invention set out in Table 3, the spacings listed in the following Table 4 result between the individual lens members of the intermediate zoom system, on the one hand, and the connecting surfaces at the stand 1, or the various microscope tubes employed, on the other hand. In this connection, the value for the distance between the connecting surface of the microscope stand 1 and the first surface of the member 11, as measured in air, is 89.235. The distance between the members 11 and 12 of the stationary part of the system is listed as $l_1$ in Table 3. The distance in air B of the table is the distance between the last surface of the member 12 and the first surface of the first adjustable member 13. The magnitude C is the sum of (a) the distance between the last surface of the member 13 and the mirror 17; (b) the distance between the mirrors 17 and 18; and (c) the distance between the mirror 18 and the first surface of the adjustable member 14. The magnitude D is the sum of the distances between (a) the last surface of the adjustable member 14 and the mirror 19; (b) the mirror 19 and the rear face of the mirror located in the optical axis; and (c) between this mirror and the connecting surface of the microscope tubes.

TABLE 4

| Magnification | B | C | D |
|---|---|---|---|
| 1.00 | 19.222 | 215.633 | 91.275 |
| 1.13 | 22.957 | 202.213 | 100.959 |
| 1.30 | 28.284 | 187.201 | 110.644 |
| 1.49 | 33.484 | 172.317 | 120.328 |
| 1.69 | 38.230 | 157.887 | 130.012 |
| 1.91 | 42.494 | 143.939 | 139.697 |
| 2.15 | 46.317 | 130.431 | 149.381 |
| 2.40 | 49.752 | 117.311 | 159.065 |
| 2.66 | 52.849 | 104.530 | 168.750 |
| 2.94 | 55.652 | 92.043 | 178.434 |
| 3.23 | 58.198 | 79.813 | 188.118 |

The values tabulated above are represented diagrammatically in FIGURE 4. It can be seen therefrom that, when the member 14 is linearly adjusted, the adjustment of the member 13 deviates only to a minor extent from a linear adjustment, if the plane of the intermediate image produced by the zoom system is to be maintained constant. The intermediate image plane of the microscope objective is illustrated in dashed lines in FIGURE 2 between the members 12 and 13.

It should be understood, of course, that the foregoing disclosure relates to only preferred embodiments of the invention and that it is intended to cover all changes and modifications of the examples of the invention herein chosen for the purposes of the disclosure, and all combinations thereof with the above referenced parent application which do not constitute departures from the spirit and scope of the invention set forth in the appended claims.

I claim:

1. In combination with a microscope having a stand supporting an objective in alignment with a main optical path and a tube supporting an ocular in alignment with said main optical path,
    an accessory optical system defining an accessory optical path extending from a first location on said main optical path to a second location on said main optical path lying closely adjacent said first location, said accessory optical system comprising:
    an initial totally reflected means located at said first location for deviating light rays coming from said objective along said main optical path into said accessory optical path;
    a terminal totally reflecting means located at said second location closely adjacent said initial reflecting means for deviating light rays from said accessory optical path toward said ocular along said main optical path;
    a plurality of spaced intermediate reflecting means located in said optical path of said accessory system for directing light rays from said initial reflecting means to said terminal reflecting means;
    first and second positive lens means located between certain of said reflecting means and lying in said accessory optical path and individually translatable in alignment with each other and said reflecting means, said first and second positive lens means constituting together a zoom lens system which forms an intermediate image of the image formed by said objective in varying degrees of magnification as said first and second positive lens means are individually translated along said accessory optical path, said intermediate image remaining substantially fixed in position as said first and second positive lens means are translated along said accessory optical path;
    spaced stationary optically aligned lens means lying on said accessory optical path between certain of said reflecting means and aligned therewith; and
    positioning means for selectively positioning said first and second positive lens means along said accessory optical path to selectively determine the magnification of said intermediate image with respect to said image formed by said objective.

2. The combination of claim 1, the individual focal lengths of the lens means and the separations being in the following ranges:

TABLE 1

| | | | |
|---|---|---|---|
| | $\lvert f_1 \rvert > 0.3L$ | $0 < l_0$ | $< 0.5L$ |
| | $\lvert f_2 \rvert > 0.3L$ | $0 < l_{1,2}$ | $< 0.5L$ |
| $0.1L$ | $< f_3 < 0.5L$ | $0 < l_{2,3}$ | $< 0.5L$ |
| $0.15L$ | $< f_4 < 0.35L$ | $0 < l_{3,4}$ | $< 0.7L$ |
| | | $0.3L < l_b$ | $< 0.9L$ | where
$f_1$, $f_2$ etc. are the focal lengths,
$l_0$, $l_1$, $l_b$ are the separations, and
L is the field length.

3. The combination of claim 1, said lens means having the following values:

TABLE 3

| | | $n_d$ | $v_d$ |
|---|---|---|---|
| | $l_0 = +49.265$ | | |
| $r_1 = +57.597$ | $d_1 = 5.0$ | 1.5168 | 64.2 |
| $r_2 = -36.721$ | $d_2 = 3.0$ | 1.6073 | 59.5 |
| $r_3 = +166.789$ | $l_1 = 21.56$ | | |
| $r_4 = +86.311$ | $d_3 = 2.5$ | 1.6200 | 36.3 |
| $r_5 = +52.549$ | $l_2 = 19.222$ to $58.198$ | | |
| $r_6 = +150.011$ | $d_4 = 4.5$ | 1.5725 | 57.5 |
| $r_7 = -35.937$ | $d_5 = 3.0$ | 1.7283 | 28.3 |
| $r_8 = -68.805$ | $l_3 = 79.813$ to $215.633$ | | |
| $r_9 = +70.883$ | $d_6 = 2.0$ | 1.7283 | 28.3 |
| $r_{10} = +35.993$ | $d_7 = 2.5$ | 1.5714 | 53.0 |
| $r_{11} = -205.21$ | $l_b = +229.775$ to $326.618$ | | |

Magnification = 1.0 to 3.23.

wherein $r_1$, $r_2$ etc. are the successive radii of the lens components or their individual elements,
$l_0$, $l_1$, etc. are the separations between the lenses, between the object and the lens nearest it and between the image and the lens nearest it,
$d_1$, $d_2$ etc. are the axial thicknesses of the lenses or their elements,
$n_d$ is the refractive index of the lens or lens element glasses, and
$v_d$ is the Abbe number of these glasses.

References Cited
UNITED STATES PATENTS

| | | | |
|---|---|---|---|
| 2,209,532 | 7/1940 | Michel | 350—184 |
| 2,433,674 | 12/1947 | O'Brien | 350—50 |
| 2,536,718 | 1/1951 | Brandon | 350—43 |
| 3,030,857 | 4/1962 | Shumway | 350—50 |
| 3,030,861 | 4/1962 | Mortimer et al. | 350—43 |
| 3,185,029 | 5/1965 | Peck et al. | 350—184 |

DAVID SCHONBERG, Primary Examiner

PAUL R. GILLIAM, Assistant Examiner

U.S. Cl. X.R.

350—103, 184